United States Patent [19]

Katsura et al.

[11] Patent Number: 4,677,549
[45] Date of Patent: Jun. 30, 1987

[54] PIPELINED DATA PROCESSOR SYSTEM HAVING INCREASED PROCESSING SPEED

[75] Inventors: Koyo Katsura; Hideo Maejima, both of Hitachi, Japan

[73] Assignee: Hitachi, Ltd., Tokyo, Japan

[21] Appl. No.: 469,047

[22] Filed: Feb. 23, 1983

[30] Foreign Application Priority Data

Mar. 1, 1982 [JP] Japan ................................. 57-30577

[51] Int. Cl.⁴ .............................................. G06F 13/00
[52] U.S. Cl. ..................................................... 364/200
[58] Field of Search ... 364/200 MS File, 900 MS File

[56] References Cited

U.S. PATENT DOCUMENTS

3,978,452 8/1976 Barton ............................. 340/172.5
4,087,852 5/1978 Campbell et al. .................... 364/200
4,263,643 4/1981 Lapp, Jr. .............................. 364/200
4,382,279 5/1983 Ugon ................................... 364/200
4,539,635 9/1985 Boddie et al. ........................ 364/200

Primary Examiner—Archie E. Williams
Assistant Examiner—Emily Yue Chan
Attorney, Agent, or Firm—Antonelli, Terry & Wands

[57] ABSTRACT

The invention relates to a digital data processor based upon the pipeline control system, which is particularly effective when the time required for reading a microprogram is relatively short. A microcycle is based upon the time required for reading the microprogram, and the operations on the data is executed in a pipeline system by dividing it up according to the determined microcycle. This is done by providing a destination latch register on the output side of the arithmetic unit. The invention further deals with the processors in which the destination latch register is provided on the input side of the arithmetic unit, or when the destination latch register is incorporated within the arithmetic unit, and a circuit setup for avoiding any contention for a register that may develop when executing a current instruction and the next instruction is provided in accordance with an added microprogram.

7 Claims, 21 Drawing Figures

FIG. 1

| | | TIME → | |
|---|---|---|---|
| FIG. 4A | $F_1$ | $ER_1$ | $EW_1$ |
| FIG. 4B | $F_1$ | $X + Y \to L$ | $L \to Z$ |
| FIG. 4C | $F_1$ | $X \to L_X$<br>$Y \to L_Y$ | $L_X + L_Y \to Z$ |
| FIG. 4D | $F_1$ | $\overline{X} \to L_X$<br>$\overline{Y} \to L_Y$ | $\overline{L}_X + \overline{L}_X \to Z$ |

PIPELINED DATA PROCESSOR SYSTEM HAVING INCREASED PROCESSING SPEED

BACKGROUND OF THE INVENTION

1. Field of the Invention:

The present invention relates to a digital data processor, more specifically, the invention relates to a data processor which effects pipeline processing and which features an increased computing speed as a whole.

Pipeline processing, in general, serves as an effective instruction control system from the standpoint of increasing computing speed. The present invention is concerned with a data processor relying upon a pipeline control system which works even when there is a great difference between the time taken for reading an instruction and the time taken for executing an operation.

2. Description of the Prior Art:

A data processor decodes an instruction word which has been read out, reads data according to the decoded contents, and executes an operation. The operation is processed using the pipeline control system, and the next microinstruction is read out in parallel with the processing of the operation. In this case, when the time required for reading a microinstruction is the same as the time required for executing an operation, the time is regarded as the microcycle period and no inconvenience results. Usually, however, the two times are not the same. In practice, the microcycle period (machine cycle) is based upon the longer one as the reference. That is, despite the use of a pipeline control system, the overall operating efficiency is not improved.

A pipeline processing system has been disclosed in U.S. Pat. No. 3,978,452 entitled "System and Method for Concurrent and Pipeline Processing Employing a Data Driven Network". The above patent discloses local storage in a data-driven network processor but does not in any way refer to problems inherent in the conventional art.

SUMMARY OF THE INVENTION

The present invention is designed to provide a data processor in which a pipeline control system is adapted to a digital data processor in order to increase the overall processing speed.

The object of the present invention is to increase the processing speed of a data processor, without sacrificing the merits of the pipeline processing system, even when there is a difference between the time taken to read a microinstruction and the time taken to execute an operation.

In order to accomplish the above object according to the present invention, a feature of the invention resides in that the operation is executed based upon a plurality of microcycles.

A second feature of the invention resides in that the operation is executed by dividing it into the reading of the arithmetical data and the writing of the operation result.

A third feature of the invention resides in the provision of a destination latch register on the output side of the arithmetic unit in order to delay the operation result by a period of time equal to one microcycle.

A fourth feature of the invention resides in the provision of destination latch registers on the input side of the arithmetic unit to correspond to each part of the arithmetical data, in order to delay the data by a period of time equal to one microcycle prior to the execution of the operation.

A fifth feature of the invention resides in that a destination latch register is incorporated in the arithmetic unit and the operation is executed after the data has been delayed by a period of time equal to one microcycle.

A sixth feature of the invention is the provision of a write-control latch register which instructs the writing of the operation result in a register field, the instructions to the write register being delayed by a period of time equal to one microcycle.

A seventh feature of the invention resides in the provision of means which detects whether there is contention for a register between a microinstruction that has been read out, and the next microinstruction being read out, so that when contention occurs, the data in the destination latch register is transferred directly to the data bus, or is transferred from the arithmetic unit directly to the data bus, in order to avoid contention for the registers.

DESCRIPTION OF THE PREFERRED EMBODIMENTS

An embodiment of the invention will be described below.

Figure 1:
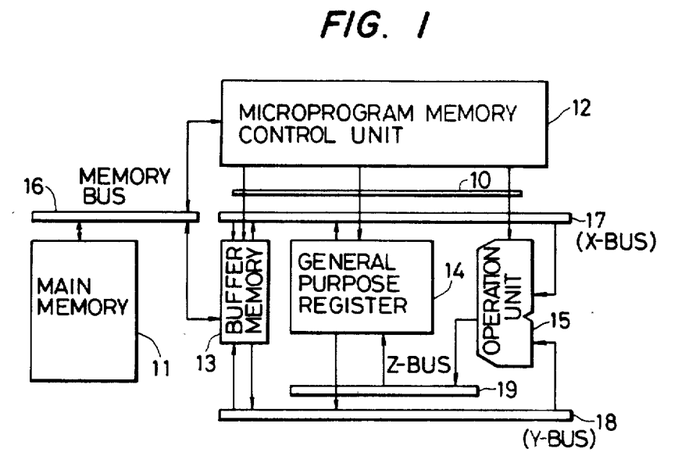
FIG. 1 is a diagram illustrating pipeline processing in a digital data processor.

First there is a description of a data processor using the pipeline control system on which the present invention is based. FIG. 1 illustrates a pipeline data processor the data processor consists of a main memory 11 for storing user programs (instruction words and operation data), a microprogram memory and control device (or instruction unit) 12 which successively reads microinstructions from a ROM and generates control signals 10 upon the receipt of instructions from a user program, and an execution unit including a data buffer register 13 for storing the data temporarily, a general-purpose register 14 for storing arithmetical data such as the result temporarily while the operation is being carried out, and an arithmetic unit 15 which can execute a variety of arithmetic operations. A memory bus 16, an X-bus 17, a Y-bus 18, and a Z-bus 19, are provided at specific locations. Instruction words read from the main memory 11 via the memory bus 16 are decoded by the microprogram memory and control device 12. As the microinstructions corresponding to the decoded contents are successively read out, various control signals 10 are generated and sent to the data buffer register 13, the general purpose register 14, and the arithmetic unit 15. The microinstructions act so that data is read from the data buffer register 13 or from the generalpurpose register 14, and an addition or subtraction is effected by the arithmetic unit 15. By reading the microinstructions of the microprogram in succession, therefore, a variety of arithmetic operations can be performed. The arithmetic unit 15 receives data read from the data buffer register 13, or from the general-purpose register 14, via the X-bus 17 and the Y-bus 18. The result obtained by the calculation using the read data is stored in the general-purpose register 14 via the Z-bus 19. The data buffer register 13 temporarily stores the data that has been read onto the X-bus 17 and Y-bus 18 from the general-purpose register 14, and also transmits and receives the data to and from the main memory 11 via the memory bus 16.

Figures 2A, 2B:
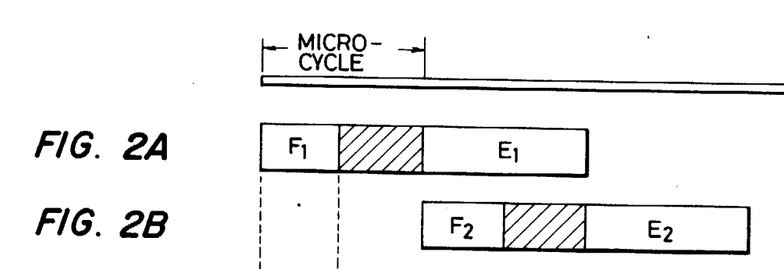
FIGS. 2A to 2C are diagrams illustrating the data processing flow in the apparatus of FIG. 1.
Figures 2C, 2D, 2E:
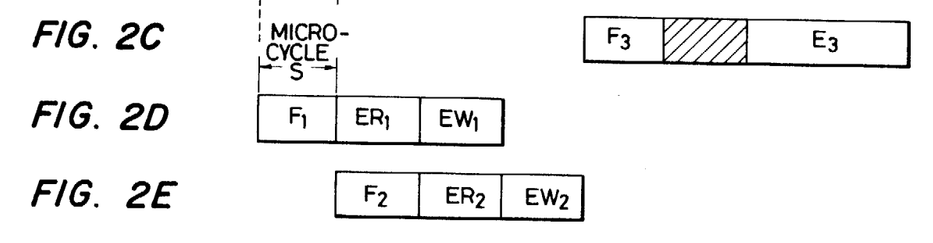
FIGS. 2D to 2H are diagrams illustrating the data processing flow according to the present invention.
Figures 2F, 2G, 2H:
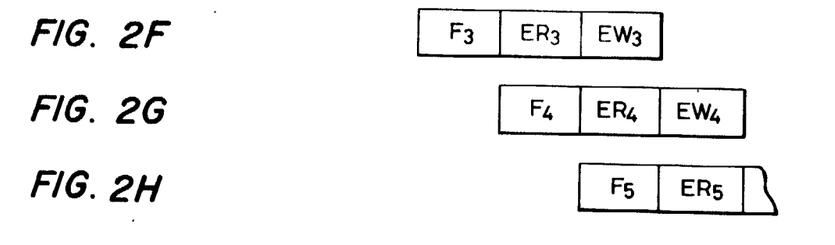

FIGS. 2A to 2C show the data processing flow in the data processor. Namely, if a certain microinstruction $F_1$ is read in a given microcycle, the processing of the microinstruction is executed as shown by $E_1$ in the next microcycle. In parallel with the execution $E_1$ of the operation, the next microinstruction $F_2$ is read (FIG. 2B). Similarly, in parallel with the execution $E_2$ of operation of the microinstruction, a further microinstruction $F_3$ is read (FIG. 2C). That is, the reading of a microinstruction and the processing of the preceding neighboring microinstructions are executed simultaneously in the same microcycle.

In this case, if the time required for reading a microinstruction is equal to the time required for executing an operation, the time may be regarded as the microcycle period and no problem arises. In general, however, these times are not equal but can differ widely depending on the size of the data processor, as well as on other conditions. In this case, the pipeline control will be performed using an increased time as the microcycle period. This however, produces idle times, and makes it difficult to increase the overall computing speed.

FIGS. 2A to 2C show the case in which an increased length of time is required for executing the operation, and in which the time required for reading the microinstructions is about onehalf of that time. In FIGS. 2A to 2C, the hatched regions after the regions $F_1$ to $F_3$ represent the so-called idle times. That is, since the period is determined by the time required for the execution of a calculation, it becomes difficult to increase the overall computing speed despite the fact that a pipeline processing system has been adopted. The present invention is designed to increase the computing speed when there is a difference between the time required for reading microinstructions, and the time required for executing the corresponding operations (usually, $F_1 < E_1$ as shown in FIG. 2A).

Figure 3:
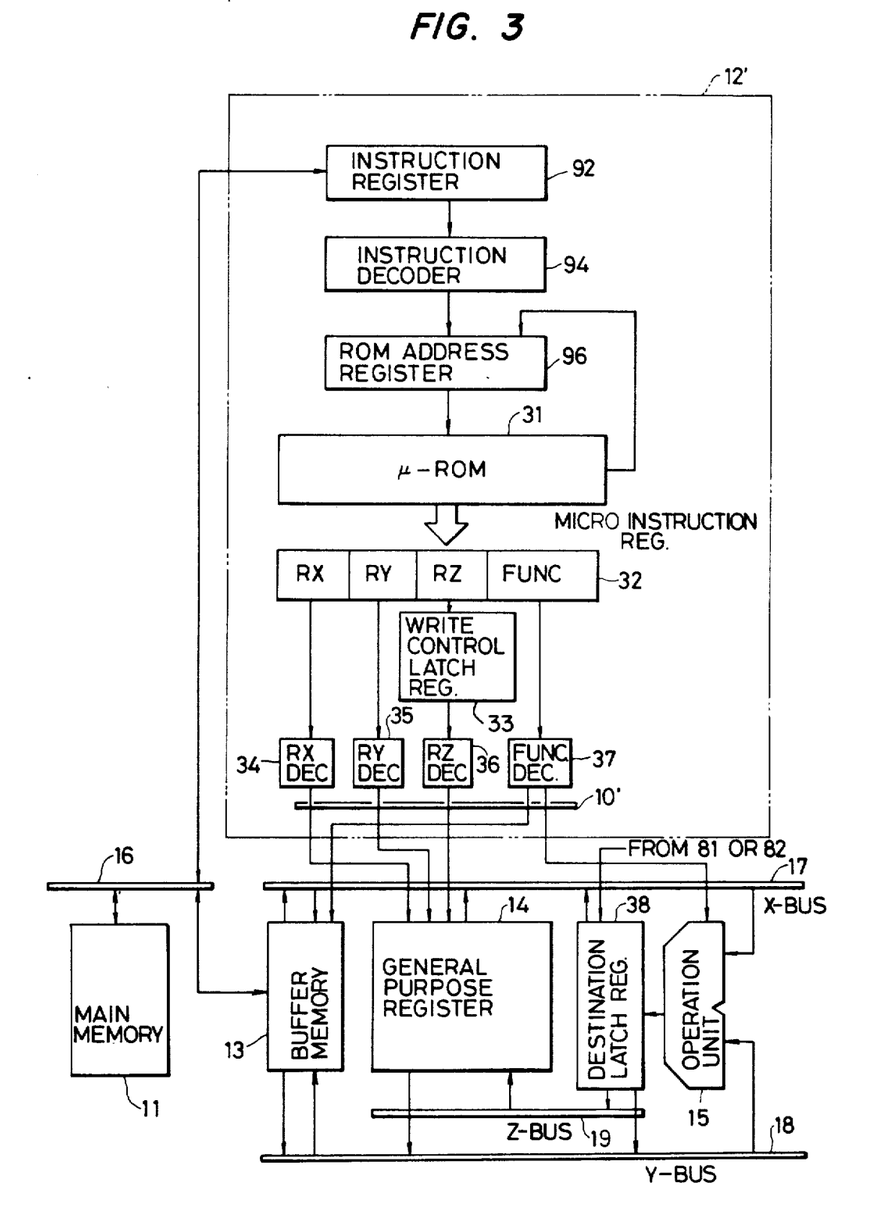
FIG. 3 is a diagram showing the circuit setup according to an embodiment of the present invention.

FIG. 3 shows an embodiment according to the present invention, i.e., it illustrates a microprogram memory and control device in detail. The microprogram memory and control device shown here is different from that of FIG. 1 in that a destination latch register 38 for delaying the operation result by one microcycle is provided between the Z-bus 19 and the operation device 15. Therefore, the operation result is stored in a specified register in the general-purpose register 14 after being delayed by one microcycle. For this purpose, the data must also be delayed by one microcycle to determine in which register the operation result should be stored. The register in the general-purpose register 14 which stores the calculation result is determined by specification data produced by an RZ decoder 36. In the embodiment of FIG. 3, a write-control latch register 33 is provided on the input side of the RZ decoder 36 to delay the specification data from the RZ decoder 36 by one microcycle.

Instruction words are read by the microprogram memory and control device 12' from the main memory 11 via the memory bus 16. Namely, the instruction words are sent to an instruction register 92, an instruction decoder 94, a ROM (read-only memory) address register 96, and a ROM 31, and are stored temporarily in a microinstruction register 32. In this case, the microinstruction consists of three register fields RX, RY, RZ, and a function field FUNC. Of these fields, the data in the register fields RX and RY specify registers in the general-purpose register 14 so that the data is read and onto the X-bus 17 and Y-bus 18. The data in the function field FUNC specifies one of various arithmetic functions. The data in the register field RZ is decoded by the RZ decoder 36 via the write control latch register 33, and the other data is directly decoded by the RX decoder 34, RY decoder 35 and function decoder 37, respectively. The outputs of these decoders serve as control signals 10 as described already.

The data read out onto the X-bus 17 and Y-bus 18 from the general-purpose register 14 according to control signals from the RX decoder 34 and RY decoder 35, are operated upon as arithmetical data by the arithmetic unit 15, and the operation result is stored temporarily in the destination latch 38. The operation result is stored in the general-purpose register 14 after being delayed by one microcycle. The RZ decoder 36 then outputs a register-specifying control signal that corresponds to the operation result, and the operation result is stored in the register selected by the control signal 10'.

Therefore, the data processing flow in the data processor of FIG. 3 can be represented by FIGS. 2D to 2H. The processing of one microinstruction is divided into a microinstruction-reading cycle Fi (i = 1, 2, 3, 4, 5, ... ), an arithmetical data-reading cycle ERi and an operation resultwriting cycle EWi. That is, three microinstructions are processed in parallel within the same microcycle. Note that the microcycle (period) in FIGS. 2D to 2H is about one-half as long as that of FIGS. 2A to 2C. The microcycle of FIGS. 2D to 2H is based upon the microinstruction reading cycle of FIGS. 2A to 2C as a reference, and the processing of the operation in FIG. 2A is executed by being divided into $ER_1$ and $EW_1$. This is equivalent to the microinstruction being read out in one-half of the microcycle of FIG. 2A. In practice, however, since there are differences in the execution time depending upon the instructions, the idle times shown in FIGS. 2A to 2C do not always become zero even in FIGS. 2D to 2H. The operation time, however, can be reduced to about one-half that of the system of FIGS. 2A to 2C. This is one of the greatest advantages of the data processor of the present invention.

In FIG. 3, the destination latch register 38 is provided on the output side of the arithmetic unit 15. Destination latch registers, however, can be provided between the arithmetic unit 15 and the X-bus 17 and the Y-bus 18 as shown in FIG. 7A, in which $L_X$ and $L_Y$ denote latch registers which fulfil the same purpose as that of the register 38, and which delay the data by one microcycle before permitting it to be input to the arithmetic unit.

Figure 7A:
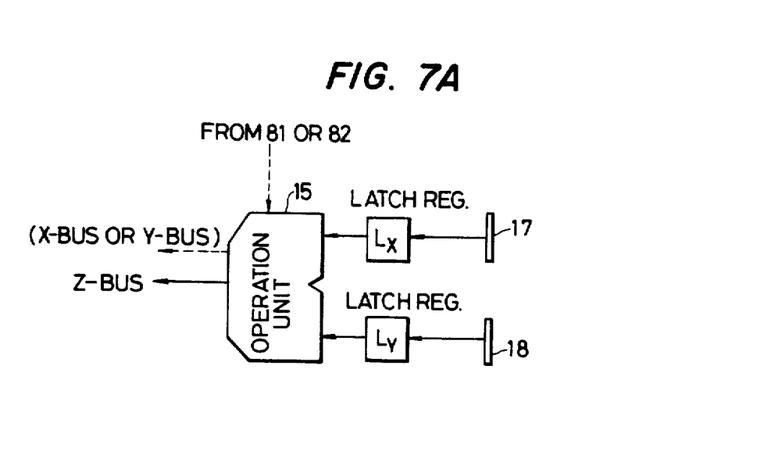
FIG. 7A is a diagram illustrating the case when latch registers are provided on the input side of the arithmetic unit to delay the data by a period of time equal to one microcycle.
Figure 7B:
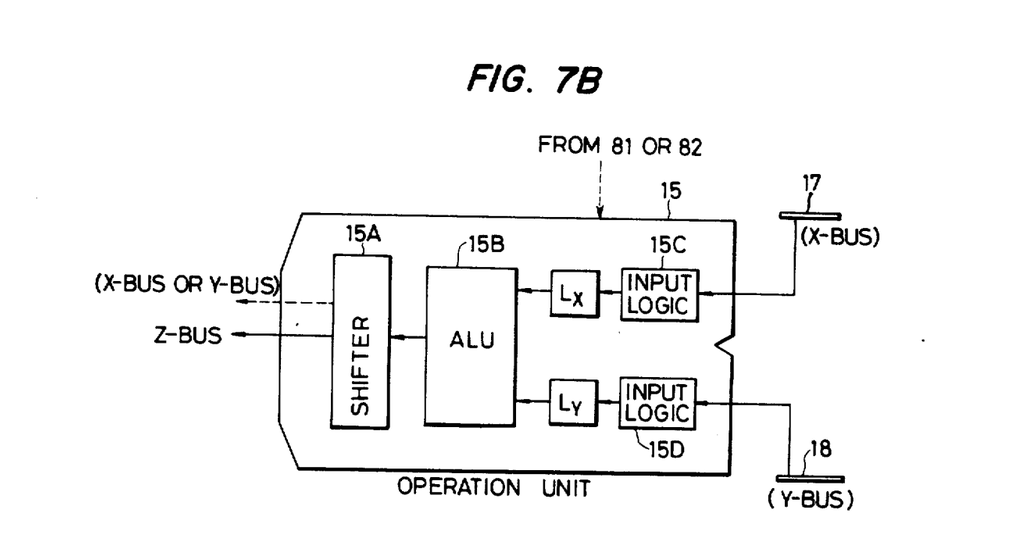
FIG. 7B is a diagram illustrating the case when registers are incorporated in the arithmetic unit.

As shown in FIG. 7B, furthermore, the destination latch registers may be incorporated in the arithmetic unit 15. Namely, the data is received from the buses 17, 18, and is passed through input logic circuits $15_C$, $15_D$ and through latch registers $L_X$, $L_Y$ where they are delayed by one microcycle, within the arithmetic unit. Reference numeral 15B denotes an arithmetic and logic unit, and 15A a shifter. Thus, the same effects as those of FIG. 3 and FIGS. 2D to 2H can be exhibited even in the units of FIGS. 7A and 7B.

Figure 4A:
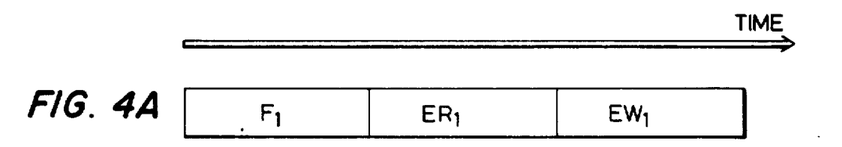
FIGS. 4A to 4D are diagrams comparing the processes of each of the cycles of the present invention.
Figure 4B:
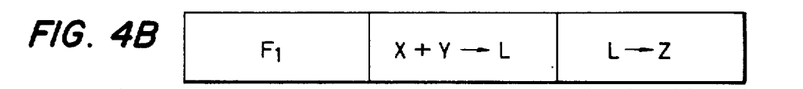
Figure 4C:
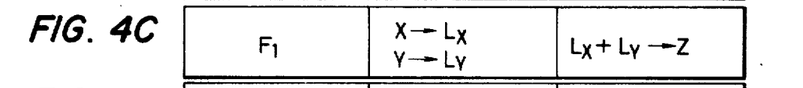
Figure 4D:
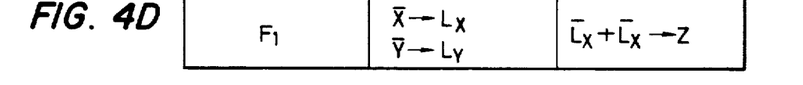

FIGS. 4A to 4D illustrate the effects of the units of FIGS. 7A, 7B compared with $F_1$, $ER_1$ and $EW_1$ of FIG. 3. FIG. 4A shows a basic cycle, and FIG. 4B shows the contents of the operation processing in the execution cycle of F, $ER_1$, $EW_1$ of FIG. 3. That is, the operation $(X+Y) \rightarrow L$ is carried out in FIG. 4B, i.e., in $ER_1$ of FIG. 2D, and the operation $L \rightarrow Z$ is carried out in $E_1$ of FIG. 2D. Similarly, FIG. 4C represents the effects of the units of FIG. 7A, and FIG. 4D represents those of FIG. 7B.

Figure 5A:
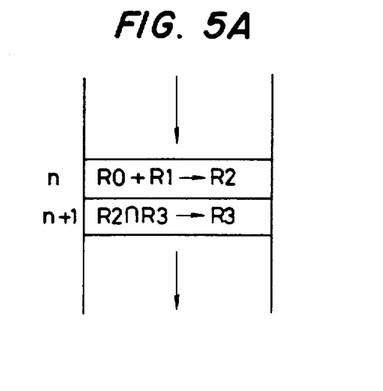
FIG. 5A is a diagram of a microprogram in which contention for registers is caused by the n-th instruction and (n+1)-th instruction.
Figure 6A:
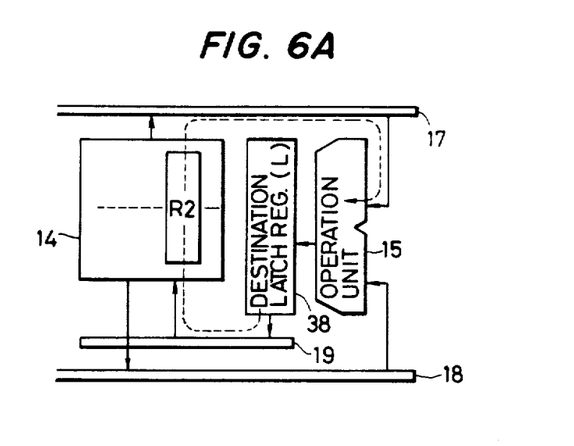
FIG. 6A is a diagram illustrating the operation which corresponds to FIG. 5A.

According to the present invention as described above, the computing speeds of the operations can be increased. Next a description of what happens when the register in which a operation result has been written in answer to a given microinstruction is the same as the register from which arithmetical data is to be read out for the next microinstruction will be present. For example, as shown in FIG. 5A, the n-th microinstruction adds the contents of the registers R0 and R1 and specifies that the operation result is to be stored in register R2, while the (n+1)-th microinstruction performs an AND operation with the contents of the registers R2, R3, and specifies that the result is stored in register R3. In this case, the processing for storing the operation result in register R2 is effected simultaneously with the processing for reading the operation data from register R2. When register contention occurs, the operation result for the n-th microinstruction must be supplied as arithmetical data from the destination latch 38 to the arithmetic unit 15 via Z-bus 19, register R2, and X-bus 17 as indicated by the broken line in FIG. 6A. In this case, however, the data must be transferred within one microcycle, which is difficult.

Figure 6B:
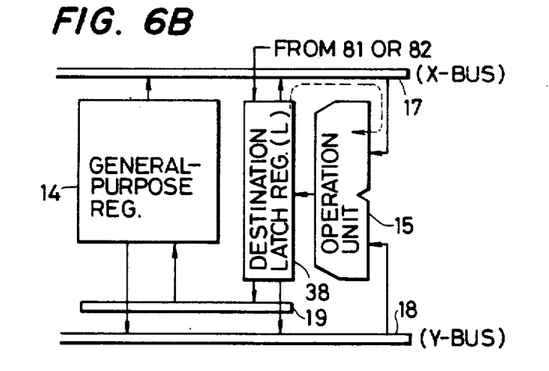
FIG. 6B is a diagram illustrating the operation which corresponds to FIG. 5B.

FIG. 6B shows a data processing apparatus which is constructed by taking this contention for registers into consideration, according to another embodiment of the present invention. Ports for reading the data are provided from the destination latch 38 the X-bus 17 and the Y-bus 18. When there is register contention, the data is not read out from the register in the generalpurpose register 14 onto the X-bus 17 or Y-bus 18, but instead, the operation result is read directly from the destination latch 38 onto the X-bus 17 and Y-bus 18. Even when a register is in contention, therefore, the data is transferred along the path indicated by the broken line, and no problem arises.

Figure 5B:
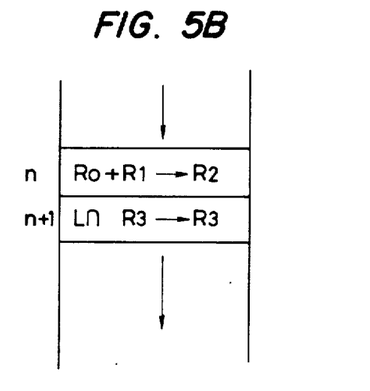
FIG. 5B is a diagram illustrating the countermeasure taken by the program when the contention of FIG. 5A occurs.

Thus, when there is register contention, the data is not read from the general-purpose register 14 onto the X-bus 17 or Y-bus 18, but the data is read directly from the destination latch 38 to the X-bus 17 and Y-bus 18. Two methods can be proposed to switch the reading of data. The first method relies upon a software technique, that is, a microinstruction is added which specifies the destination latch 38 as the register for reading the data onto either the X-bus 17 or the Y-bus 18. When there is register contention, a microprogram is accessed using the above microinstruction. In the example of FIG. 5A, therefore, a microinstruction is accessed in the manner as shown in FIG. 5B. According to this method, however, although there is no addition to the hardware, a microprogram must be accessed after a consideration of whether register contention will occur.

The second method consists in detecting the contention for a register by hardware means without adding a microinstruction, in order to switch the reading of the data by depending on a detected result. According to this method, the programer does not have any additional burden of preparing a microprogram. The data can be switched by adding a small amount of hardware.

Figure 8:
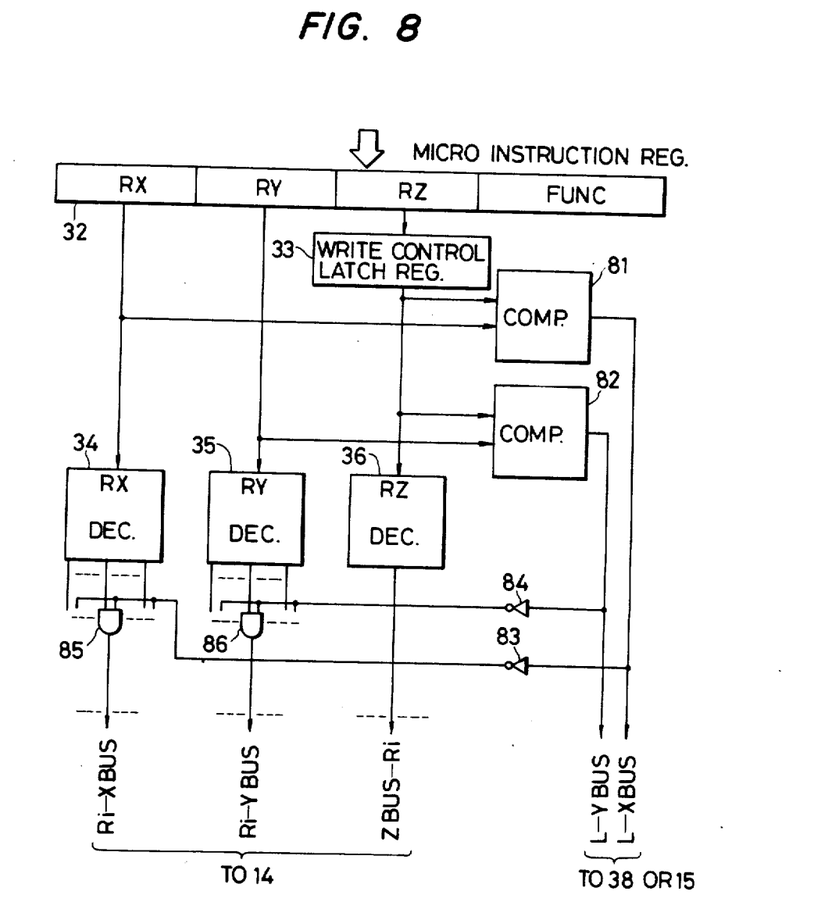
FIG. 8 is a diagram which illustrates the setup for avoiding, by a hardware technique, any contention that may occur for the registers, as shown in FIG. 5A.

FIG. 8 illustrates the main part of a data processor which employs the second method. As described above, the output of the write-control latch 33 specifies a register in which the operation result will be stored. Therefore, it is easy to detect whether or not a register is in contention, by detecting whether the output of the write-control latch 33 is the same as the data of the RX or RY field in the microinstruction register 32. An X-bus agreement-detection circuit 81 detects the case when a contention for a register concerns the X-bus 17. When the output of the write control latch 33 is the same as the data of the RX field, an agreement-detection output is sent, via an inverter 83, to an AND gate (group) 85 to close it. Therefore, the control signal from the RX decoder 34 to the general-purpose register 14 is inhibited, and the data may be read out from the destination latch 38 onto the X-bus 17. A Y-bus agreement-detection circuit 82, an inverter 84, and an AND gate (group) 86 work in the same manner for the Y-bus 18. The X-bus agreement-detection circuit 81 and the Y-bus agreement-detection circuit 82 are simply constructed by using exclusive OR gates and NOR gates, and present very few problems from the hardware standpoint. With the data processor of FIG. 8, pipeline control can be suitably carried out without presenting any problems from the software or hardware standpoints, and without any time delay even when a register is in contention.

In FIG. 6B, the destination latch is provided on the output side of the arithmetic unit. When the destination latch is provided on the input side of the arithmetic unit, or is incorporated within the arithmetic unit, the operation result of the arithmetic unit is read directly onto the X-bus and Y-bus by the gate control.

In FIG. 7A, output signals from the agreement-detection circuits 81, 82 are input to the arithmetic unit 15, and the operation result is not sent to the Z-bus, but is sent directly to the X-bus or the Y-bus. The same holds true even in the unit of FIG. 7B. Namely, output signals from the agreement-detection circuits 81, 82 are input to the arithmetic unit 15, and the operation result is not sent to the Z-bus, but is sent directly to the X-bus or the Y-bus. The broken lines of FIGS. 7A and 7B indicate these conditions.

According to the present invention as described above, the time required for reading microinstructions, the time required for reading the arithmetical data, and the time required for writing the operation result, are virtually equalized. According to the present invention, furthermore, three microcycles are allotted to one microinstruction so that partial processing of three microinstructions can be performed in parallel in the same microcycle. In the present invention, therefore, partial processing is effected simultaneously and in parallel for the three microinstructions within the same microcycle, under a condition in which idle time is shortened when compared with conventional processors. Therefore, the overall computing speed can be increased.

What is claimed is:

1. A pipelined data processing system comprising memory for storing instructions to be executed and results of the execution of instructions, a microinstruction unit coupled to said memory for decoding instructions successively supplied thereto from said memory, for successively reading microinstructions in accordance with the instructions and for generating execution control signals, and an execution unit coupled to said microinstruction unit for successively executing the microinstructions in accordance with the execution control signals successively generated by said microinstruction unit, said microinstruction unit comprising:
decoder means for decoding respective instructions as they are coupled to said microinstruction unit from memory;
read only memory means for storing microinstructions to be successively accessed in accordance with the decoding of instructions by said decoder means;
microinstruction register means having at least one read register field, a write register field and a function field for temporarily storing therein expected contents of microinstructions as they are successively accessed from said read only memory means, the contents of each of said register fields being employed for the generation of an execution control signal to be supplied to said execution unit;
microinstruction decoder means including a read register field decoder, a write register field decoder and a function field decoder coupled to decode the respective register fields and function field of said microinstruction register means and to thereby generate said execution control signals; and
write control latch register means, coupled between said write register field decoder means and said write register field of said microinstruction register, for storing the contents of said prescribed register field for a period of one machine cycle; and said execution unit comprising:
first and second data buses;
data register means coupled to said first and second data buses for receiving and storing data carried over said first and second data buses and for placing data stored therein on to said first and second data buses in response to execution control signals supplied thereto from said register field decoders of said microinstruction unit;
data processng means, coupled to said first and second buses and coupled to receive execution control signals supplied from said function field decoder in accordance with the contents of said function field, for processing data provided over said first and second buses;
a writing signal bus coupled to said data register means, for supplying the result of the processing of data by said data processing means to said data register means for storage therein;
latch register means coupled between said data processing means and said writing bus for temporarily storing the result of the processing of data by said data processing means for a period of one machine cycle;
control means for controlling, during each machine cycle, the coupling of an ith microinstruction from said read only memory to said microinstruction unit, the coupling of data to said data processing unit via said first and second data buses for an $(i-1)_{th}$ microinstruction, and the coupling of the result of the processing of data by said data processing means to said data register means in said writing bus for an $(i-2)_{th}$ microinstruction, so that these operations are carried out in parallel;
coincidence detection means coupled to said write control latch register means and to said read register field for detecting whether data to be processed is stored in a storage location in said data register means to which the result of the processing of data by said data processing means is to be coupled, and
logic means, coupled to receive execution control signals generated by said microinstruction decoder means, and to said coincidence detection means, for selectively inhibiting the transfer of data to be processed from said data register means to said first and/or second data buses in response to said coincidence detection means detecting that data to be processed is stored in a storage location in said data register means to which the result of the processing of data by said data processing means is to be coupled, and wherein said latch register means includes means coupled to said first and second buses for coupling the result of the processing of data to one of said first and/or second data buses in response to the operation of said logic means.

2. A pipelined data processing apparatus according to claim 1, wherein said latch register means is also connected to said first and second data buses and is controlled by said microinstruction unit so that a data processing operation is carried to by said data processing means after data supplied thereto via said first and second buses has been delayed in said latch register means by one machine cycle.

3. A pipelined data processing system according to claim 2, wherein said microinstruction unit includes means coupled to said microinstruction register means for controlling said latch register means to determine whether said result is to be stored in said data register means or is to be transferred to said first and second data buses.

4. A data processing apparatus according to claim 2, wherein said latch register means is incorporated within said data processing means for delaying data to be processed by one machine cycle.

5. A data processing apparatus according to claim 1, wherein said data register means includes at least two registers for storing and for transferring data to be processed and further includes at least one further register for storing and transferring the result of the processing of data by said data processing means.

6. A data processing apparatus according to claim 2, wherein said data register means includes at least two registers for storing and for transferring data to be processed and further includes at least one register for storing and transferring the result of the processing of data by said data processing means.

7. A data processing apparatus according to claim 4, wherein said data register means includes at least two registers for storing and for transferring data to be processed and further includes at least one register for storing and transferring the result of the processing of data by said data processing means.

* * * * *